Patented May 5, 1953

2,637,722

UNITED STATES PATENT OFFICE 2,637,722

LUBRICANT AND METHOD OF MAKING SAME

David Frazier, Cleveland, Ohio, assignor to The Standard Oil Company, Cleveland, Ohio, a corporation of Ohio No Drawing. Application May 31, 1950, Serial No. 165,382

12 Claims. (Cl. 260—139)

This invention relates to a method of improving the color and odor stability of lubricants and lubricant additives and to the resulting improved lubricants and lubricant additives.

In order to satisfy the public desire, a lubricating oil should be clear and light-colored, and odorless. The lubricating oil, from the standpoint of engine performance, must also contain an additive which inhibits deterioration of the oil during use in an internal combustion engine. The phosphorus sulfide-oxygenated organic compound-olefin reaction products constitute one class of additives which give excellent results in the latter respect. These additives, however, are darker colored than the oils and their addition imparts a darker color to lubricating oils. Moreover, these additives liberate hydrogen sulfide on standing, because of instability of some of the chemically-bound sulfur contained therein, and therefore oils containing such additives become foul-smelling in use or after storage. The dark color and the hydrogen sulfide liberated from such additive-containing oils deters the public from purchasing them in the quantities their valuable performance characteristics should ensure.

Typical of this class of additives are those described and claimed in U. S. Patent No. 2,566,241 of John M. Musselman, dated August 28, 1951, wherein is disclosed a process of preparing these additives by reacting a mixture of 1 to 10 parts of a polyolefin capable of improving the viscosity index of a lubricating oil and 1 part of an oxygen-containing organic compound having a boiling point of at least 225° F. with a phosphorus sulfide at a temperature in the range of 225° to 500° F., in proportions such that the reaction product thereby obtained contains 5 to 60% by weight of a phosphorus sulfide and 95 to 40% of the oxygen-containing organic compound-polyolefin mixture.

The present invention is directed to the improvement of the color and odor stability of these reaction products by treating the same with an alkali hydroxide in the range of 0.125 to 0.75% by weight and sufficient to improve the color thereof, followed by treatment with hydrogen peroxide in an amount in the range of 0.15 to 0.5% by weight and sufficient to improve the odor stability of the reaction product.

It has been demonstrated that treatment of such reaction products with an alkali hydroxide alone gives a considerable color improvement, and that oils containing the hydroxide-treated additive darken less than the untreated oils after heating for three days at 150° F. The stability against odor formation is also improved somewhat. It has also been demonstrated that treatment of such reaction products with hydrogen peroxide alone markedly improves the odor stability but gives a product having a considerably darker color and poorer color stability than the untreated product. In fact, the color deterioration which results from the hydrogen peroxide treatment alone exceeds the color improvement obtained by hydroxide treatment alone, so that it would be expected that the treatment of a hydroxide-treated additive with hydrogen peroxide would degrade the color to a point where the treated additive is darker than the untreated additive. Surprisingly, however, the data show that the color, as measured by optical density, is better after the combined treatments than after treatment with hydroxide alone. Moreover, the hydrogen sulfide developed is considerably less than when treated with hydrogen peroxide alone, thus demonstrating the improved odor stability of the product of the invention.

The objects achieved in accordance with the invention include the provision of an agent of improved color and odor stability which may be useful itself as a lubricant, and which when added to lubricants will improve the viscosity index and also markedly inhibit the very objectionable deposition of lacquer, and, at the same time, inhibit acid and sludge formation, corrosion and other types of deterioration occurring under operating conditions; the provision of lubricating oils containing such an addition agent; and other objects which will be apparent as embodiments of the invention are disclosed hereinafter.

The reaction product treated in accordance with the invention may be made with direct admixture of the reactants, or, if desired, by their admixture in the presence of a diluent which may or may not be subsequently removed. A heavy oil, such as white oil, or a lubricating oil having about the same properties as that to which the new composition is to be added may be used as a diluent. Oil may be added after the reaction such as during a subsequent filtration. The reaction is usually complete in about 10 hours or less time, generally 1 to 2 hours. The reaction time is a function of the temperature, the amount of the sulfide that is to react, the subdivision of the reactants, the efficiency of mixing, etc.

The mixture of polyolefin and oxygen-containing organic compound may be reacted with the phosphorus sulfide or a mixture of phosphorus sulfides in ratios from 5 to about 60 weight per cent of the phosphorus sulfide based on the weight of the above mixture, depending on the type of mixture. Generally about 10 to about 50 per cent is the usual range that will be used, depending on the molecular weight of the polyolefin and its proportions relative to the oxygen-containing organic compound, and about 10 to about 20 per cent is especially desirable.

Phosphorus pentasulfide is preferred although other phosphorus sulfides or mixtures of sulfides may be employed. Phosphorus pentasulfide is most economic and readily available and for this reason is used in the illustrative examples.

The polyolefin which may be used is one which improves the viscosity index of lubricating oil, e. g., one having a molecular weight of about 2,000 to 100,000 and which is soluble in lubricating oil. These materials are substantially saturated as the art will appreciate. As mentioned above, such materials are known in the art. The commercially available material is known as "Paratone" which is a polyisobutylene polymer of 10,000 to 20,000 molecular weight in such amount in a solution of oil as to give a viscosity of about 3,000 S. U. S. at 210° F.

An ester wax such as degras. lanolin or sperm oil is a preferred oxygen-containing organic compound. In the broader aspects of the invention, there may be used such a compound containing hydroxy. carbonyl, or ether oxygen, and desirably one of rather high molecular weight, preferably boiling above the reaction temperature, e. g., at least 225° F. The reaction may be conducted under pressure, if desired, in the case of lower boiling materials. There may be used esters, as alkyl or cycloparaffin or aryl esters of organic acids: fatty oils, higher alcohols. higher carboxylic acids, saturated and unsaturated, monobasic and dibasic, petroleum acids, naphthenic acid, rosin, modified rosin, glycol ethers, higher ketones and aldehydes; also halogenated derivatives of any of these. Illustrative of some conveniently applicable materials are: beeswax, lanolin, sperm oil, other waxes, butyl stearate, ethyl lactate, methyl oleate. butyl ricinoleate, butyl phthalate, methyl stearate, methyl dichlorostearate, methyl chloro-naphtenate, dichloropalmitic acid, coconut oil, babassu oil. hydrogenated coconut and other vegetable oils. other fatty oils, ethylene glycol monoethers, diglycol chloro-hydrin. lauryl alcohol, stearic acid, lauric acid, oleic acid, palmitic acid, myristic acid, naphthalic acid, naphthoic acid, benzoic acid, naphthenic acids, hydroxystearic acid, dihydroxybenzoic acids, hydroxynaphthenic acids, dihydroxystearic acid, chlorobenzoic acid, dichlorostearic acids, dichlorobenzoic acids, dichlorodihydroxystearic acid, lactones. palmitone, oxidized petroleum fatty acid or other petroluem product, as oxidized wax, kerosene, gas oil or other oxidized petroleum oil. The oxygenated compound used in forming the reaction product should be selected with reference to the use of the final composition and properties desired in it, e. g., to give a reaction product having oil solubility or dispersibility.

In the illustrative embodiment it is preferred to use about 3 parts by weight of the polyisobutylene oil solution available as "Paratone" with about one part by weight of the degras or other oxygenated organic material. If the "Paratone" is assumed to be a 40% to 50% solution in oil, this would be about 1.2 to 1.5 parts of the polyisobutylene to one part of degras. However, widely different proportions show significant improvements and an amount of polyolefin in the range of 1 to 10 parts by weight to one part of the oxygenated material is desirable.

The reaction may be carried out in the presence or absence of air, or in the atmosphere of inert or non-deleterious gas, such as nitrogen or $H_2S$. It may also be carried out under pressure, e. g., the pressure generated when the reaction is carried out in a closed vessel.

The reaction temperature varies with polyolefin and oxygen-containing compounds and is readily ascertained. The optimum is in the range of 225° to 500° F., although a higher temperature which is below that at which the reaction product would be decomposed could be used. A temperature of at least 250° to 300° F. is preferred in many cases.

An element of the sulfur family, i. e., sulfur, selenium or tellurium, can be incorporated into the reaction product by adding elemental sulfur or a compound which yields sulfur, such as by treating a derivative of the sulfide-derived reaction product therewith, or treating a derivative of the sulfide-derived reaction product therewith.

In accordance with the present invention, the resulting reaction mixture is treated with an amount of alkali hydroxide sufficient to improve or lighten the color thereof. Generally, this will be in the range of 0.1 to 0.75% by weight of the reaction mixture. The alkali hydroxide preferably is in the form of an aqueous solution, such as a 50% solution, although the solid hydroxide may also be employed. Alkali hydroxides which have been found to be suitable are potassium hydroxide, sodium hydroxide and ammonium hydroxide.

The reaction mixture is mixed and heated with the alkali hydroxide at a temperature in the range of 160° to 220° F., preferably about 200° F. and for a time in the range of 15 minutes to 2 hours, preferably one-half hour. During reaction the reaction mixture is preferably blown with an inert gas, such as air or nitrogen, to remove water formed in the course of the reaction and/or added with the alkali hydroxide. If water is present in the additive when added to an oil, a cloudy solution is obtained. This is prevented by the blowing step.

Then the reaction mixture is treated with hydrogen peroxide in an amount sufficient to improve the odor stability thereof, particularly as measured by the formation of hydrogen sulfide on heating. Generally this will be in the range of 0.15 to 0.5% by weight of the reaction mixture. The peroxide ordinarily is added in the form of an aqueous solution, preferably a 30% solution. Aqueous solutions of hydrogen peroxide or sodium peroxide are satisfactory sources of hydrogen peroxide.

The reaction is carried out at a temperature in the range of 160° to 220° F., preferably 200°, and for a time in the range of 15 minutes to 2 hours, preferably one-half hour. Air or inert gas is preferably blown through the mixture during reaction in order to remove water therefrom for the reason stated above.

The amount of the final reaction product (i. e., the additive) to be incorporated in an oil or grease will depend upon the characteristics of the oil or grease and the intended use. Some oils have more of a tendency to corrode metals, or to form acids, sludges and lacquer deposits than others, and such oils require larger quantities of the addition agent. Also, oils that are intended for use at higher temperatures require larger amounts of the additive. In general, the range is from about ½ to about 10%; under some circumstances, amounts as low as about 0.01% show a significant improvement. Since the provided reaction product is a lubricant, there is no upper limit. However, it may be uneconomical to include in the lubricant more of the provided reaction product than is necessary to impart the desired properties, such as 50%.

The following examples and tests illustrate and point out advantages of the invention and also the criticality of the ranges of alkali hydroxide and peroxide:

*Example 1*

Twenty parts by weight of $P_2S_5$ is mixed with such portion of 100 parts of a neutral diluent lubricating oil (15 lbs. per barrel acid-treated lubricating oil stock having a viscosity of 225 S. U. S. at 100° F.) as to form a slurry and this is mixed with a mixture of 25 parts of degras and 75 parts of the above-described "Paratone." The balance of the 100 parts of the neutral diluent oil is added and the mixture agitated for one hour at 305° to 310° F.

To a 100 gram sample of this reaction mixture there were added the amounts of 50% commercial potassium hydroxide indicated in the following table. The samples were then heated to 200° F. and blown with air at that temperature for one-half hour. Other samples were treated by adding the indicated amount of 30% aqueous hydrogen peroxide solution and blowing the reaction mixture with air at 200° F. for one-half hour. Other samples had both treatments as shown in the following table. Various tests on the samples were made as indicated in the following table with the results shown:

hydroxide and hydrogen peroxide. These are computed by correlating the results of Samples 1 to 4, 7, 10 and 13, which show that treatment with 0.5% hydrogen peroxide increases the optical density by 11 points and treatment with 0.3% hydrogen peroxide by 12 points, respectively, while treatment with 0.125% potassium hydroxide reduces the optical density by 5 points, with 0.25% potassium hydroxide by 24 points, with 0.375% potassium hydroxide by 28 points and with 0.5% potassium hydroxide by 26 points.

The optical density found for Samples 5, 6, 8, 9, 11, 12, 14 and 15 show that contrary to what would be expected a reduction in color is obtained greater than with the potassium hydroxide treatment alone.

That treatment with 0.15% hydrogen peroxide and 0.125% potassium hydroxide is the desirable lower limit of concentration of these reactants is demonstrated by the results obtained in Samples 5 and 6. The color improvement in these samples is not as satisfactory as in the latter samples where more potassium hydroxide and hydrogen peroxide are used. That 0.5% potassium hydroxide and 0.5% hydrogen peroxide are the desirable upper limits of concentration of these compounds is demonstrated by the results obtained in Sample 15, wherein somewhat poorer results are obtained than in the other samples. Best results for the combined treatment are obtained with 0.125% potassium hydroxide and 0.3% hydrogen peroxide, as shown in Sample 6,

| No. | Treatment | | Additive Analyses | | | | | 4 Percent Additive in No. 20 Motor Oil | | | | | | |
|---|---|---|---|---|---|---|---|---|---|---|---|---|---|---|
| | | | | | | | | Optical Density | | | Hydrogen Sulfide (p. p. m.) | | | |
| | KOH* | H₂O₂* | Percent S | Percent P | Saponification Number | Neutralization Number | Percent Ash | Original | After 1 day at 150° F. | | Original | After 1 Day At 150° F. | After 3 Days at— | |
| | | | | | | | | | Found | Expected | | | 75° F. | 150° F. |
| 1 | 0 | 0 | 3.27 | 0.74 | 34.8 | 8.4 | 0.80 | 114.0 | 141.0 | | 11.2 | 20.00 | 6.95 | 12.10 |
| 2 | 0 | 0.15 | | | | | | 116.8 | 152.0 | | | | | 3.93 |
| 3 | 0 | 0.30 | | | | | | 117.5 | 153.2 | | 5.6 | 3.30 | 3.96 | 3.85 |
| 4 | 0.125 | 0 | | | | | | 114.0 | 136.0 | | | | | 4.86 |
| 5 | 0.125 | 0.15 | | | | | | 114.9 | 131.0 | 147.0 | | | | 2.51 |
| 6 | 0.125 | 0.30 | | | | | | 122.1 | 131.0 | 148.0 | | | | 0.84 |
| 7 | 0.25 | 0 | 3.07 | 0.78 | 32.8 | 7.0 | 1.93 | 115.7 | 117.0 | | | | | 6.0 |
| 8 | 0.25 | 0.15 | | | | | | 109.2 | 113.0 | 128.0 | 3.3 | 5.58 | 4.02 | 3.80 |
| 9 | 0.25 | 0.30 | | | | | | 118.5 | 113.0 | 129.0 | | | | 2.80 |
| 10 | 0.375 | 0 | | | | | | 113.4 | 113.0 | | | 10.10 | | 6.97 |
| 11 | 0.375 | 0.15 | | | | | | 112.1 | 109.0 | 124.0 | | | | 3.11 |
| 12 | 0.375 | 0.15 | | | | | | 107.3 | 114.0 | 124.0 | 4.1 | 5.52 | 3.90 | 3.00 |
| 13 | 0.50 | 0 | | | | | | 111.5 | 115.2 | | 3.5 | 11.20 | 6.57 | 5.20 |
| 14 | 0.50 | 0.15 | | | | | | 116.8 | 112.0 | 126.0 | | | | 2.49 |
| 15 | 0.50 | 0.30 | 3.15 | 0.75 | 34.1 | 6.1 | 2.28 | 113.4 | 114.0 | 127.0 | | | | 4.0 |

* G/100 g. samples.

Sample No. 1 shows that the increase in optical density and hydrogen sulfide content after heating the untreated additive at 150° F. for one day and for three days, respectively, is quite high. Samples 2 and 3 show that the hydrogen peroxide treatment alone is effective in reducing the hydrogen sulfide content but darkens the product, as evidenced by the increase in the optical density, to a value greater than that of the untreated product. Samples 4, 7, 10 and 13 show that treatment with potassium hydroxide alone improves the color and also reduces the hydrogen sulfide content, but in the latter respect is not nearly as good as hydrogen peroxide.

From the optical densities of these samples there is computed the optical density that would be expected for Samples 5, 6, 8, 9, 10, 11, 12, 14 and 15 by treating them with both potassium with 0.25% and 0.375% potassium hydroxide and 0.15 and 0.3% hydrogen peroxide, as shown in Samples 8, 9, 11 and 12, and with 0.5% potassium hydroxide and 0.15% hydrogen peroxide, as shown in Sample 14.

An additional advantage of the treatment is shown when water is added to the additive after heating the same for three days at 150° F. The untreated additive showed a sharp increase in the evolution of hydrogen sulfide from 12.1 to 22.2 parts per million whereas Sample 12 only increased from 3.0 to 3.6 parts per million. This shows that the additives treated in the method of the invention give little or no increase in the evolution of hydrogen sulfide when wet. This is especially important since the additives are often subjected to water which may accumulate in the crank case of an engine.

Example 2

Example 1 was repeated, treating the additive with flake potassium hydroxide rather than 50% aqueous potassium hydroxide solution. The product obtained showed a reduction in hydrogen sulfide content from 46.3 to 19.6 parts per million after three days heating at 150° F. The color as measured by the optical density was also improved.

Improved hydrolyzable sulfur type additives are also obtained by treatment in accordance with the invention by a procedure similar to that set forth in Example 1 of additives containing oxygenated compound, other than degras, such as

*Example 3.*—Myristic acid

*Example 4.*—"Spermafol No. 52" (a hydrogenated sperm oil having an iodine value of 6 to 7, a melting point of 50–52° C., a free fatty acid content (as oleic) of 1 to 2%, a saponification value of 135–138)

*Example 5.*—"Alox No. 152" (an oxidation product of paraffin wax, including a mixture of alcohols, acids, ketones and other oxidation products of paraffin, as described in U. S. Patent No. 2,419,325)

*Example 6.*—Dipentadecyl Ketone $(C_{15}H_{31})_2CO$ (available commercially under the trade name "Palmitone")

*Example 7.*—Lauryl alcohol $(C_{12}H_{25}OH)$

Comparable results are also obtained using additives formed by reaction with other polyolefins or other oxygenated materials, or other phosphorus sulfides or mixtures thereof.

Example 8

In another set of experiments, the additive prepared in accordance with the process set forth in Example 1 was treated with 0.5% potassium hydroxide at 200° F. with air blowing for one-half hour, followed by treatment with 0.3% aqueous 30% hydrogen peroxide solution at 200° F. for one-half hour with air blowing to remove water. The treated sample showed a hydrogen sulfide reduction from 49.1 to 18.7 parts per million, and a lighter color.

It is essential that the reaction products treated in accordance with the invention be treated first with alkali hydroxide and then with hydrogen peroxide. Treatment with both reagents simultaneously or with hydrogen peroxide first and with alkali hydroxide second, does not give the improved results noted heretofore. The products so produced are much darker in color than the starting material, and smell strongly of hydrogen sulfide, indicating poor odor stability.

The lubricant additives prepared in accordance with the invention are suitable for use under various conditions, including high temperatures or high pressure or both; as, for instance, when incorporated in a motor oil for use in an internal combustion engine operating at high temperatures and in which the lubricant is in close contact with metallic surfaces, metal compounds and high temperature gases. They are also suitable as extreme pressure lubricant agents in oils and greases.

If desired, the additives of the invention may be used together with the other oil addition agents, e. g., pour point depressants or film strength agents. In some instances, it is desirable to include in a lubricating oil containing the additive an agent for improving the clarity of the oil, e. g., lecithin, lauryl alcohol, and the like, which are known to the art. In order to prevent foaming of the oil containing a small proportion of the additive, it is desirable in some cases to add a very small amount of tetra-amyl silicate, an alkyl ortho carbonate, ortho formate or ortho acetate, or a polyalkyl-silicone oil, which prevent foaming upon the bubbling of air through oil containing a few per cent of the additive.

It is intended to claim the invention broadly, except as limited by the following claims.

The term "hydrogen peroxide compound" used in the claims includes hydrogen peroxide and compounds yielding hydrogen peroxide, such as sodium peroxide.

I claim:

1. A method of improving the color of lubricants and lubricant additives which are reaction products of 5 to 60% by weight of a phosphorus sulfide and 95 to 40% of a mixture of one part by weight of an oxygen-containing organic compound selected from the group consisting of those compounds containing hydroxy, carbonyl, ether and carboxy radicals having a boiling point of at least 225° F. with 1 to 10 parts of a polyolefin having a molecular weight of about 2,000 to 100,000 and capable of improving the viscosity index characteristic of a lubricating oil, reacted together at a temperature in the range of 225° to 500° F., which method comprises treating such reaction products with an amount of an alkali hydroxide in the range of 0.1 to 0.75% by weight of the reaction mixture and sufficient to improve the color of the reaction product and then treating the resulting reaction product with an amount of a hydrogen peroxide compound in the range of 0.15 to 0.5% by weight of the reaction mixture and sufficient to improve the stability of the reaction product and recovering the improved reaction product.

2. Reaction products produced in accordance with the method of claim 1, characterized by improved color and odor stability.

3. The method of claim 1 wherein the polyolefin is of about 10,000 average molecular weight.

4. The method of claim 1 wherein the phosphorus sulfide is $P_2S_5$.

5. The method of claim 4 wherein the polyolefin is of about 10,000 average molecular weight.

6. The method of claim 5 wherein the oxygen-containing organic compound contains a carbonyl group.

7. The method of claim 6 wherein the carbonyl oxygen-containing organic compound is an ester.

8. The method of claim 7 wherein the ester is degras.

9. Reaction products produced in accordance with the method of claim 8, characterized by improved color and odor stability.

10. The method of claim 1 wherein the alkali hydroxide is added in the form of an aqueous solution.

11. The method of claim 1 wherein the alkali hydroxide is added in solid form.

12. The method of claim 1 wherein the treatment with an alkali hydroxide and a peroxide is carried out while blowing the reaction mixture with an inert gas.

DAVID FRAZIER.

References Cited in the file of this patent

UNITED STATES PATENTS

| Number | Name | Date |
|---|---|---|
| 2,496,508 | Watson et al. | Feb. 7, 1950 |
| 2,507,731 | Mixon et al. | May 16, 1950 |
| 2,566,241 | Musselman | Aug. 28, 1951 |